Figure 3:
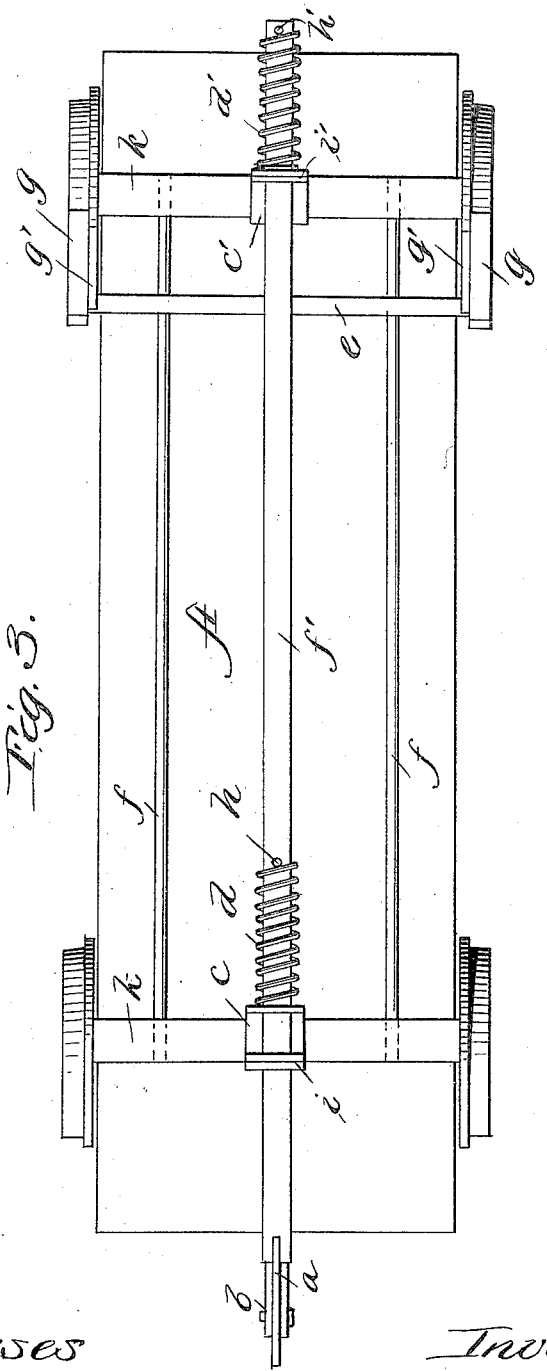

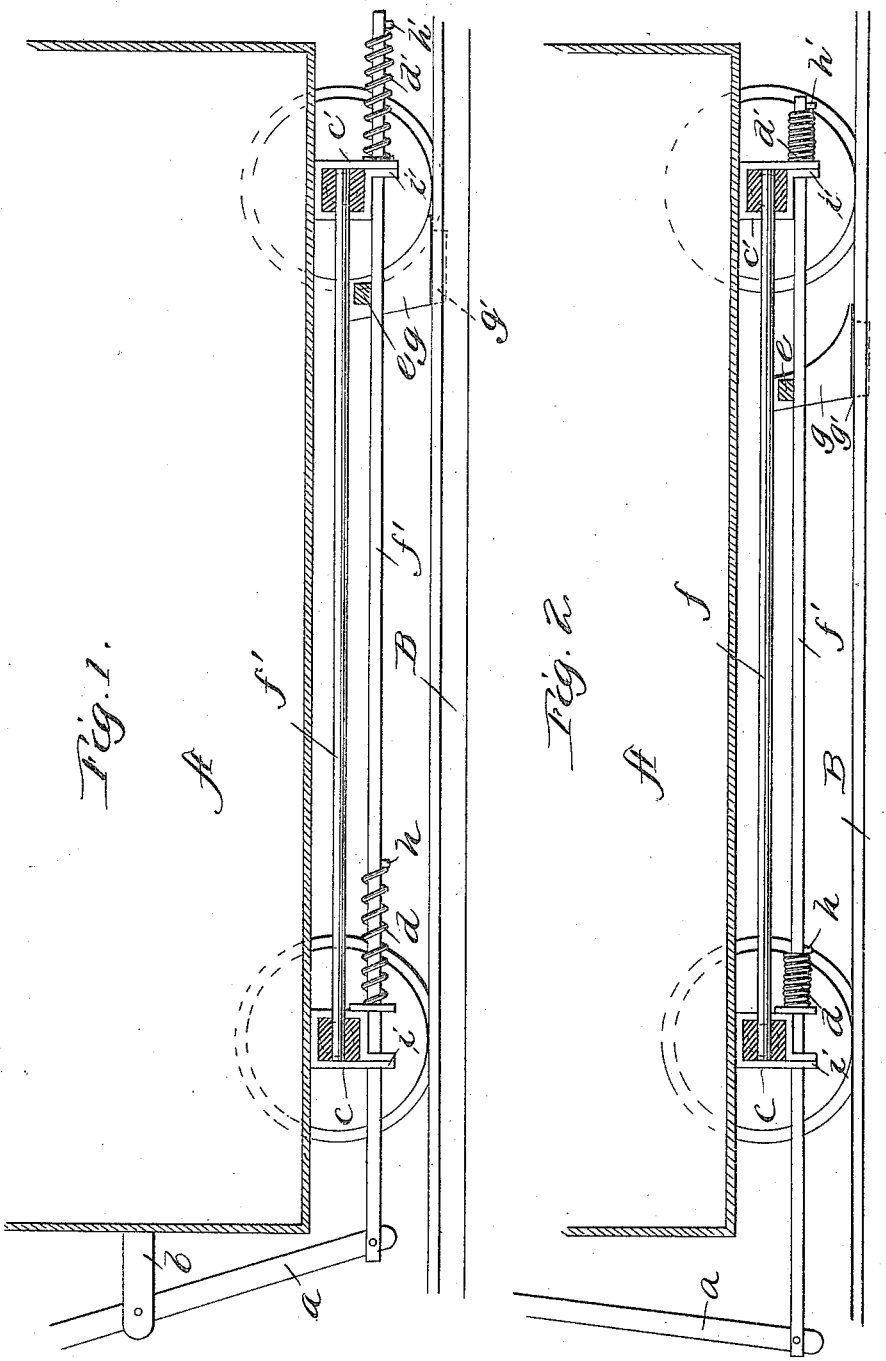

(No Model.) 2 Sheets—Sheet 2.
C. NITTINGER.
BRAKE FOR VEHICLES.

No. 446,464. Patented Feb. 17, 1891.

Witnesses
W. P. Keene
F. L. Middleton

Inventor
Carl Nittinger
by Ellis Spear
Atty.

UNITED STATES PATENT OFFICE.

CARL NITTINGER, OF LANGENSALZA, GERMANY.

BRAKE FOR VEHICLES.

SPECIFICATION forming part of Letters Patent No. 446,464, dated February 17, 1891.

Application filed May 26, 1890. Serial No. 353,273. (No model.)

*To all whom it may concern:*

Be it known that I, CARL NITTINGER, of Langensalza, in the Kingdom of Prussia and German Empire, have invented new and useful Improvements in Brakes for Vehicles, of which the following is a specification, reference being had therein to the accompanying drawings.

This invention relates to improvements in brakes for vehicles.

The brake hereinafter described can be used for vehicles of any description traveling on rails; but it is more particularly applicable to railway trucks or wagons, such as those used in mines or on local lines employed in cement and other works, in order to transport the raw material upon railway lines. The accompanying drawings illustrate the application of the improved brake to such a truck.

Figure 1 is a longitudinal section of the vehicle with the brake applied thereto. Fig. 2 is part of a longitudinal section with the brake shown out of gear, while Fig. 3 is an underneath view of the vehicle with the brake applied.

The body A of the truck is carried in the ordinary manner upon the wheel-axles $k$. The latter are firmly connected together by the longitudinal iron bars $f$, and are surrounded centrally by wide iron bands $c$ and $c'$, which extend below, forming brackets $i\ i'$, within which the brake-rod $f'$ is mounted. The latter extends along the whole length of the truck underneath the same, and is actuated by the operating-lever $a$, which oscillates upon a bracket $b$, fixed to the body of the carriage, as illustrated. Upon the brake-rod $f'$ are placed immediately behind the two axles $k$ (against which they bear at one end) two strong spiral springs $d$ and $d'$, the other ends of which press against the collars $h$ and $h'$, so that by pushing back the brake-rod $f'$ the springs $d$ and $d'$ are expanded. The brake-arm $e$ is placed in front of the hind wheels between the longitudinal bars $f$ and the brake-rod $f'$, being firmly connected to the latter, and these arms carry sliding brake blocks or shoes $g$. The latter have on their inner side a projecting edge $g'$, which serves as a guide to the same when the truck is in motion in the same manner as the flange on the wheel. The lower sliding surfaces or sledges are raised slightly off the rails B when out of use. When the brake is not acting, the operating-lever $a$ is drawn in, and the springs $d$ and $d'$ are consequently pressed together, as indicated in Fig. 2.

When it is required to apply the brakes, the operating-lever $a$ is released and the springs $d$ and $d'$ force the brake-shoes $g$ upon the wheel-tires. The latter turning against the shoes, causes the lower straight surface of the brake to slide upon the rails, and the brake becomes fully applied. The latter cannot skid on account of the guiding-edges $g'$ of the brake-shoes.

The improved brake is applicable to the front as well as to the rear, or to both wheels.

What I claim, and desire to secure by Letters Patent of the United States, is—

In a brake for railway-trucks and other vehicles, a brake-rod arranged beneath the vehicle and carrying at the extremity of a pair of arms brake blocks or shoes adapted to press against the periphery of the wheels of the vehicles and upon the surface of the rails, all mounted and operating substantially as described.

In witness whereof I have hereunto set my hand in presence of two witnesses.

CARL NITTINGER.

Witnesses:
WILHELM SCHWIETHAL,
PAUL FISCHER.